(12) United States Patent
Ermilov

(10) Patent No.: US 8,938,682 B2
(45) Date of Patent: Jan. 20, 2015

(54) PLATFORM FOR ARRANGING SERVICES BETWEEN GOODS MANUFACTURERS AND CONTENT OR SERVICE PROVIDERS AND USERS OF VIRTUAL LOCAL COMMUNITY VIA AUTHORIZED AGENTS

(71) Applicant: Sergey Nikolayevich Ermilov, Moscow (RU)

(72) Inventor: Sergey Nikolayevich Ermilov, Moscow (RU)

( * ) Notice: Subject to any disclaimer, the term of this patent is extended or adjusted under 35 U.S.C. 154(b) by 26 days.

(21) Appl. No.: 13/655,792

(22) Filed: Oct. 19, 2012

(65) Prior Publication Data

US 2014/0115501 A1    Apr. 24, 2014

(51) Int. Cl.
  *G06F 3/048*    (2013.01)
(52) U.S. Cl.
  USPC .......................................................... 715/757
(58) Field of Classification Search
  CPC ................................................. G06F 3/04815
  USPC ........................................................... 715/757
  See application file for complete search history.

(56) References Cited

U.S. PATENT DOCUMENTS

| | | | | |
|---|---|---|---|---|
| 8,285,638 B2* | 10/2012 | Jung et al. | ...................... | 705/39 |
| 2008/0281694 A1* | 11/2008 | Kretz et al. | ...................... | 705/14 |
| 2009/0063646 A1* | 3/2009 | Mitnick | ...................... | 709/206 |
| 2009/0199275 A1* | 8/2009 | Brock et al. | ...................... | 726/4 |
| 2009/0222424 A1* | 9/2009 | Van | ...................... | 707/3 |
| 2009/0271309 A1* | 10/2009 | Gordon et al. | .................. | 705/37 |
| 2012/0278740 A1* | 11/2012 | Robinson et al. | ............. | 715/757 |
| 2013/0073388 A1* | 3/2013 | Heath | ...................... | 705/14.53 |

* cited by examiner

*Primary Examiner* — Matt Kim
*Assistant Examiner* — Mary Dixon
(74) *Attorney, Agent, or Firm* — Blakely, Sokoloff, Taylor & Zafman LLP

(57) ABSTRACT

A social networking platform having users grouped into multiple groups of residents based on users' geographical areas, each group representing a virtual local community representing the corresponding geographical area. Each resident is identified by a resident identifier having a common local community identifier that uniquely identifies the corresponding geographical area in which the residents actually reside. Each resident is provided a three-dimensional (3D) homepage having items resembling items owned by the resident in an actual resident home. Some of the items decorated in the 3D homepage can be activate to invoke an authorized agent which will access a goods/service provider on behalf of the resident for purchasing further items. An authorized agent can be installed and available to a virtual community only if the residents allow. Based on the purchase, a resident is rewarded with credits for future purchases and ownership shares of the authorized agent.

30 Claims, 8 Drawing Sheets

PLATFORM FOR ARRANGING SERVICES
BETWEEN GOODS MANUFACTURERS AND
CONTENT OR SERVICE PROVIDERS AND
USERS OF VIRTUAL LOCAL COMMUNITY
VIA AUTHORIZED AGENTS

FIELD OF THE INVENTION

Embodiments of the present invention relate generally to social networking. More particularly, embodiments of the invention relate to a platform for arranging goods manufacturers and service or different content providers with users of a virtual local community via authorized agents.

BACKGROUND

Social network services have been in existence for a number of years. Social network services typically consist of online communities of individuals who share similar background, interests, and/or activities, and are interested in meeting or interacting with other individuals in the network. Most social network services are Web based and provide a variety of ways for users to interact, such as e-mail, instant messaging, posting blogs, and posting comments on each other's social network pages.

Conventional social networks lack of a platform to incorporate a social network environment to track users' goods and service consumption based on geographical areas associated with the users.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
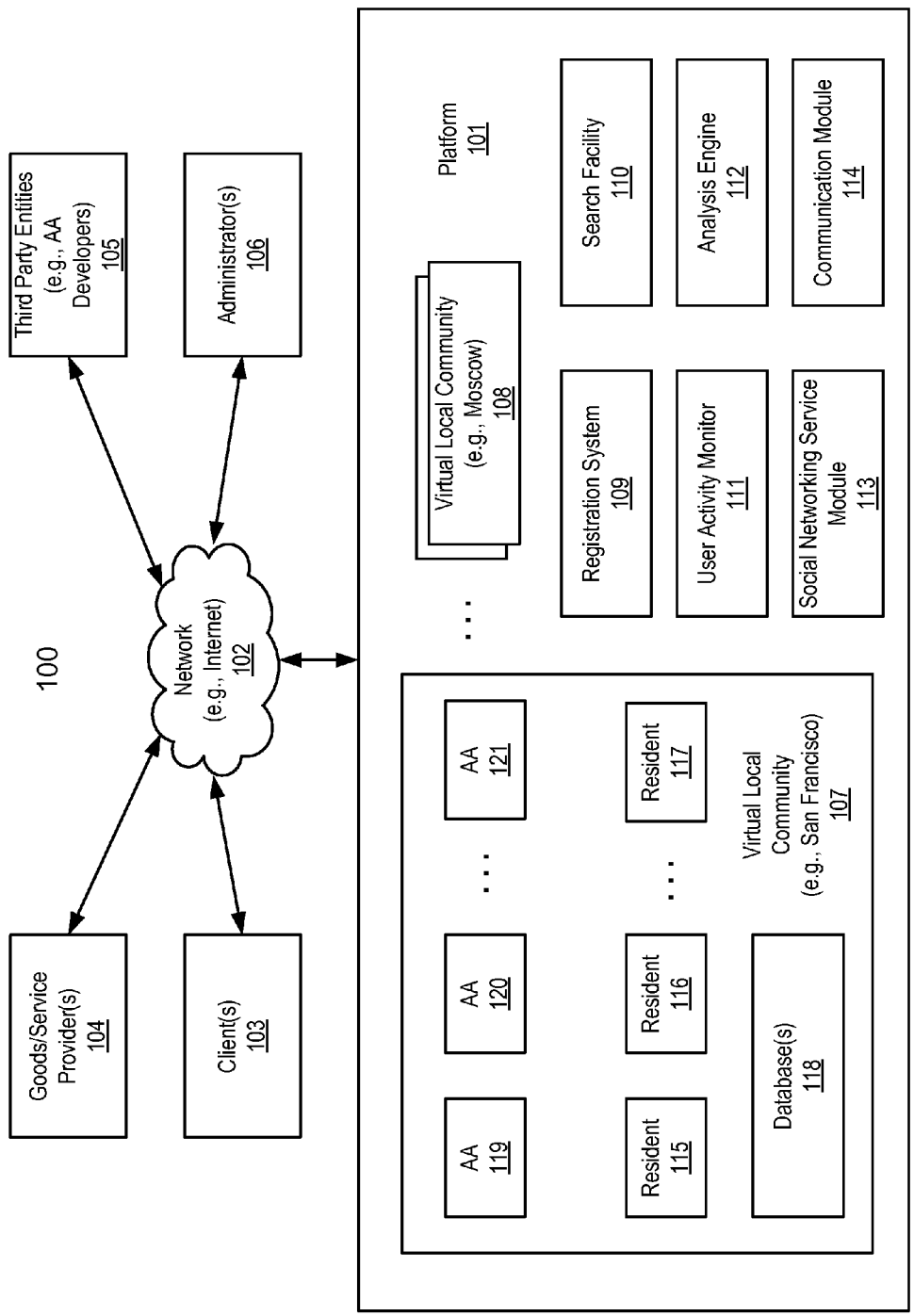
FIG. 1 is a block diagram illustrating a network configuration according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a platform is provided for organizing interaction of users registered on the Web site with goods manufacturers and service or content providers in order to satisfy their social, commercial, information, and other needs, where the users are arranged based on their geographical areas which form one or more virtual local communities on the platform. In addition, one or more databases are maintained to store personal consumption of goods, services, information, and other types of content, which may be indexed based on the associated geographical areas. Such databases can be consolidated into a collective or logical database of personal consumption of multiple Internet users.

The platform also allows one or more third-party authorized agents to be associated with the users, where an authorized agent (AA) is associated with a particular geographical area and represents users of that geographical area to interact with a goods/service provider, for example, for the purpose of purchasing or acquiring goods or services directly from the goods/service provider in a collective or aggregated manner. A user may get better prices for goods/services avoiding resellers' services via the associated authorized agent based on transactions with a goods/service provider. The user may also be rewarded with ownership shares of the corresponding authorized agent based on the transactions or activities via the authorized agents and with dividends on the shares of the authorized agent owned by him. The term of "goods/service provider" in general refers to any entity or person that provides goods, service, or content. A provider may be a manufacturer, an importer/exporter, or a distributer. A provider may be a service provider providing a variety of services or a content provider providing a variety of content such as news.

According to some embodiments, each user within the same geographical area is identified by a user identifier (ID) or username having a community identifier that uniquely identifies the corresponding geographical area. Similarly, an authorized agent associated with a virtual local community is identified by an agent identifier that includes the associated community identifier that uniquely identifies the associated virtual community. As a result, one can determine a geographical area of a user or authorized agent simply based on an ID of the user or the authorized agent. One can also search users or agents within a particular geographical area by searching the corresponding community identifier, for example, for determining the user activities (e.g., purchasing patterns or trends of goods or services) of a particular geographical area or contacting users in that geographical area, or receive news and other information from a certain geographical area.

FIG. 1 is a block diagram illustrating a network configuration according to one embodiment of the invention. Referring to FIG. 1, network system 100 includes an online platform 101 accessible over network 102 by a variety of entities, such as clients 103, goods/service providers 104, third-party vendors 105, and administrators 106. Platform 101 may be hosted by a server or a cluster of servers, which may be a Web server, a cloud server, an application server, a backend server, or a combination thereof. Clients 103 may present any computing devices, such as, for example, a laptop, a desktop, a tablet, a mobile phone (e.g., Smartphone), a personal digital assistant (PDA), a media player, a gaming device, or the like. Network 102 may be a wide area network (WAN) such as the Internet, a local area network (LAN), or a combination of one or more of a WAN or LANs. Network 102 may represent a wireless network, a wired network, a combination of both. Platform 101 may include or be associated with a Web interface (e.g., Web server) or an application programming interface (API) to allow other parties 103-106 to communicate and access resources or services provided by platform 101. For example, client 103 or administrator 106 can access platform 101 over network 102 using a browser application or a dedicated application associated with platform 101 (e.g., a specific application installed at a mobile device that is designed to specifically access the platform).

According to one embodiment, users can register with platform 101 to become members of a virtual local community. The registered users are managed by platform 101 as residents based on the geographical areas in which the users actually reside, forming different virtual local communities 107-108. In this example, referring to FIG. 1, users that reside in the same geographical area (e.g., San Francisco) are grouped as residents 115-117 of virtual local community 107. According to one embodiment, each of residents 115-117 is identified by a user identifier (ID) having a community identifier that uniquely identifies the corresponding geographical area associated with virtual local community 107. The user identifier or resident identifier may be automatically assigned, without user intervention, to a user when the user registers with platform 101 via registration system 109.

Platform 101 also allows one or more third-party authorized agents 119-121 to be associated with residents 115-117 or virtual local community 107. An authorized agent (AA) is associated with a particular geographical area and represents users of that geographical area to interact with a goods/service provider, for example, for the purpose of purchasing or acquiring goods or services directly from goods/service providers 104 in a collective or aggregated manner. In this example, authorized agents 119-121 may be developed by third-party entrepreneurs 105, authorized by residents 115-117, and installed within virtual local community 107. A resident may get a better price for goods/services due to avoiding resellers when making a purchase via the associated authorized agent based on transactions with a goods/service provider. For example, an agent operates as a buyer's agent on behalf of residents and directly deals with a manufacturer of a particular kind of goods without a middleman such as a reseller in between. The agent may be able to obtain a contracted price for a group of residents from the manufacturer (e.g., similar to a volume discount) that is lower than the price obtained via a middleman such as a reseller. In return, the agent may receive a reasonable commission based on the transaction. Meanwhile, the residents receive a better price while the manufacturer is able to sell without having to advertising its goods or going through the middleman. Based on the revenue generated via the agent, the share price of the ownership shares of the agent may increase. The resident may also be rewarded with ownership shares of the corresponding authorized agent based on the transactions or activities via the authorized agents.

Similar to residents 115-117, each of authorized agents 119-121 associated with virtual community 107 is identified by an agent identifier that includes the associated community identifier that uniquely identifies virtual local community 107. As a result, one can determine a geographical area of a user or authorized agent simply based on an ID of the user or the authorized agent. One can also search users or agents within a particular geographical area by searching the corresponding community identifier, for example, for determining the user activities (e.g., purchasing patterns or trends of goods or services) of a particular geographical area or contacting users in that geographical area. Although not shown, other virtual local communities 108 may be implemented in a similar structure or architecture.

According to one embodiment, platform 101 further includes a variety of systems or service modules to provide a variety of services to clients. Platform 101 further includes search facility 110 to allow a user (e.g., resident or external non-member users) to search databases such as database 118 associated with a virtual local community or to search residents or authorized agents within a virtual local community. Note that although the residents voluntarily provide goods or service consumption related information in database 118, the information provided from database 118 in response to a search request may be anonymous information without exposing identities or other sensitive information of the residents. For example, names, phone numbers, or detailed addresses of the residents may not be exposed; only the geographical area such as city or town of the residents may be provided in a search result. Analysis engine 112 can be invoked to analyze the data such as user goods and service consumption patterns or trends, which may be tracked or monitored by user activity monitor 111. For example, one can utilize search facility 110 and analysis engine 112 to analyze and determine the goods and service consumption patterns or trends of a particular local community, as residents within a virtual local community are organized based on their actual geographical areas in which the residents actually reside in the real world.

Platform 101 further includes social networking service module 113 to provide a variety of social networking services to the registered users. Social networking service module 113 may include a web blogging service, a social bookmarking service, a photo sharing service, and a news service. A blog service allows users to write personal and social commentary which may be presented to both users in the same community, and the public at large. A social bookmarking service allows users to share a web link that the user thinks other users might find interesting. A photo sharing service allows users to share photos which have been uploaded to a data store (not shown) with other users and with public. A news service allows users to receive news or messages from other geographical areas by communicating with agents from those areas. Platform 101 further includes communication service module 114 to provide communication services to users of communities. Communication service module 114 may provide a number of different communication services including, for example, an e-mail service, an instant messaging or chat service, and a voice communication service. Other services may also be provided.

Databases 118 can be analyzed via analysis engine 112 for a variety of purposes. Databases 118 may store current consumption/anticipated consumption of the residents linked to the place of their actual residence, to provide the residents and authorized agents (also referred to as authorized companies) with an opportunity to analyze what goods, services and content people use in any geographical area or community of the world; to find an authorized agent of a certain type (goods, services, knowledge, information, etc.) in the geographical area that a resident selects. An authorized agent can arrange interaction with residents living in the community the authorized agent is registered with.

According to one embodiment, the residents of a community voluntarily provide their information for joint databases that are arranged according to local communities the residents live in. Every resident provides his/her information anonymously. Inside databases 118, the resident's international number is available to an authorized agent only to analyze demand in its goods/services. During the analysis it is not possible to extract information entered by one of the residents on different goods items.

For example, a resident from San Francisco wants to buy an unusual scarf that is not on sale in San Francisco. Using search facility 110, the resident finds scarves of the quality he likes which are most popular among the residents of Paris. The resident from San Francisco enters in the search facility 110: the community identifier for Paris, the product, e.g., "scarf, silk", and other parameters. As a search result he receives a table specifying: manufacturers, figures on the scarves sales in Paris per each manufacturer (e.g., a kind of a rating by sales volumes that looks like horizontal lines of different length). The sales figures are calculated by platform 101 on the basis of purchases made by the residents living in Paris via the corresponding authorized agents and analysis of the products (by analysis engine 112) that were paid for from the accounts in the platform's credit union in Paris.

According to one embodiment, activating on a manufacturer name, a resident opens the list of the Paris authorized agents arranging purchases of scarves made by this manufacturer for the Paris residents. He can receive an advice on every manufacturer by contacting one of the Paris authorized agents using the communication services provided by communication service module 114. A click on the sales figure opens a list that shows miniature homes (e.g., icons) of the Paris "agents." Any Resident can become an "agent" if he installs an "agent" option against the scarf image after he has bought this scarf via the corresponding authorized agent. The "agent" option means that a resident is ready to provide his/her opinion on this scarf based on his personal impressions to anyone who needs it.

A San Francisco resident can also look through the agents' opinions on a particular product. A San Francisco resident can also select the home of one of the agents the image of which he likes most and contact this Paris resident using communication service module 114 to discuss the scarves he likes. The Paris agent receives a bonus from the authorized agent of San Francisco after the San Francisco resident makes his/her purchase and gets a chance to extend the circle of his/her friends among the residents from other areas of the world. He/she has a chance to contact and talk to a resident from Paris who likes such scarves and who buys them.

In order to get access to the resources of platform 101, a user has to register with platform 101 via registration system 109. A user can access a user registration interface provided by registration system 109 to register and create a user account. The user interface may be implemented in a variety of forms which may contain fields to receive at least the geographical area information in which the user actually resides. During the registration, a user needs to enter information of his/her home telephone number (e.g., landline) or his/her residence address. In one embodiment, a user has to enter at least the geographical are such as the city or town he/she currently resides, while the street or building numbers may be optional. Based on this information registration system 109 automatically assigns a user identifier (e.g., username) to the user.

According to one embodiment, a user identifier includes a location identifier or community identifier that uniquely identifies the corresponding geographical area in which a user actually resides. In one embodiment, a user identifier includes one or more digits corresponding to the public telephone network number rules for international calls. A user identifier complies with recommendation and standard E.164 of the International Telecommunication Union (ITU). In a particular embodiment, a user identifier contains at least three groups of digits. The first group contains a country code; the second group contains a numbering area code, the so-called ABC, for the geographically based numbering area inside a country; and the third group contains a unique number having the same amount of digits as fixed telephone numbers of the public telephone network in the country where a user actually resides. The third group of numbers is generated by registration system 109 without user intervention. Each user is assigned with a unique user identifier that is unique amongst all registered users.

In addition, each user is assigned with an email address under the platform's domain name. An email address of a user corresponds to the user identifier on the platform. Each user is further associated with a homepage for the user. The homepage address corresponds to the user identifier under the platform's domain name. A homepage of a user's web site and web pages linked to it are referred to as "home," where the homepage address may include a unique part of the corresponding user identifier. The platform is a stimulating method of entering information through a personal web page on consumption for concrete residents in a real city and a system for analyzing the information entered by the residents and authorized agents.

Further, each user is associated with a credit union or a cooperative bank used for any transaction via the platform, where the account number of the credit union/cooperative bank may also be automatically assigned that contains certain unique part of the corresponding user identifier. The account number corresponds to the user's identifier (e.g., login name). Registration on the platform constitutes the user's consent to become a shareholder, where users of the credit union are co-owners of the credit union. A credit union/a cooperative bank is a member-owned financial cooperative, democratically controlled by its members, and operated for the purpose of promoting thrift, providing credit at competitive rates, and providing other financial services to its members. Credit unions/cooperative banks differ from commercial banks and other financial institutions in that the members who have accounts in the credit union are the owners of the credit union and they elect their board of directors in a democratic one-person-one-vote system regardless of the amount of money on a user's account in the credit union/cooperative bank. In one embodiment, every owner of a credit union owns one share of the credit union. The value of the share is fixed and the same for every member of the credit union.

For example, for a user living in Moscow, a user identifier may be generated by registration system 109 in a format of 7495XXXXXXX, where 7 corresponds to a country code of Russia; 495 corresponds to the area code of Moscow; and XXX XXXX represents personal unique seven-digit user number generated automatically by the platform's registration system, which is compatible with a format of an international phone number. An email address of the same user may be assigned with 7495XXXXXXX@[platform's domain name]. A homepage of the user may be assigned with www.7495XXXXXXX.[Platform's domain name].coM or www.[Platform's domain name].com/7495/XXXXXXX/. An account number for the same user in the platform's credit union may be assigned with 7495XXXXXXX, which is a part of the corresponding user identifier.

Similarly, for a user living in San Francisco, the user identifier will be 1415XXXXXXX, where 1 corresponds to the country code of the U.S.A.; 415 corresponds to the area code of San Francisco; XXX XXXX represents a unique seven-digit user number generated automatically by the platform's registration system. The email address will be 1415XXXXXXX@[Platform's domain name].com. The homepage address will be www.1415.XXXXXXX.[Platform's domain name].com or www.[Platform's domain name].com/1415/XXXXXXX/. The account number in the Platform's Credit Union corresponding to the Login 1415XXXXXXX.

A legal entity registered on the platform is referred to as an authorized agent or authorized company. Natural persons and legal entities registered on the Platform together are referred to as users of the platform. The company which owns the legal rights in the platform is referred to as an administrator of the platform. Registration of legal entities on the platform is carried out by the following algorithm: assignment of an agent identifier, an e-mail address, a web site address, a code including, for instance, four or more characters or symbols, specifying the type of activity of the company in order to meet the requirement for the shareholding structure of the company being registered on the platform. Those companies can be registered on the platform the owners of a certain minimal number of shares of which are the residents or administrator of the platform. Requirements to the structure of shares of authorized agents are set by the administrator of the platform. The residents own the shares of the authorized agents, for example, through the ownership in the shares of the fund of the platform legally organized as a trust fund or in another form. The administrator of the platform and the credit union manage the fund of the platform. According to one embodiment, up to 60% of every authorized company or agent are owned by multiple residents of the platform. The residents receive these 60% shares free of charge.

For example, one of the possible variants of registration for a law firm from San Francisco: company identifier—1415XXXXXXX, where XXXXXXX is a unique company number generated automatically by the platform's registration system and corresponding to the company's office address; email address—1415XXXXXXX.@AAAA.[Platform's domain name].com, where AAAA the Platform's code for companies providing legal services; homepage address www.1415XXXXXXX.AAAA.[Platform's domain name].com; and account number in the platform's Credit Union corresponding to the entity identifier 1415XXXXXXX; 60% shares—residents beneficiaries; 10% shares—the administrator of the platform beneficiary, where percentage of the shares transferred to the residents is determined by the platform's administrator and depends on the type of business of the authorized agent or company. There can be another, different from the above, way of combining the identifier, the company type code, the domain name for writing the e-mail address and the web site address and the shareholding structure of a company registered on the platform.

The difference of the platform's user registration system from the conventional systems on other Internet sites is that the registration system itself assigns a user identifier (e.g., username for login purposes) to every user according to the rules of assignment of the public telephone network numbers conforming to the recommendation of the International Telecommunication Union (ITU). In one embodiment, the platform's registration system does not use the existing cellular or landline telephone numbers of the users. The platform forms a database of numbers of its anonymous users and the corresponding homepages. The platform's database of the users' numbers and the data of the users' homepages together form publicly accessible databases. It means that any Internet user can perform a search of the homepages of the platform's residents living in a certain selected geographical area. The search result will be shown including miniatures (e.g., thumbnails or icons) of the residents' homepages including their user identifiers.

Clicking on the miniature, a user can open the resident's homepage to public that has the Home image. But further pages, besides the homepage, are not accessible for such a user. According to one embodiment, the real name or photo of a resident is not shown on the home page. In one embodiment, a homepage of a resident includes an image of a real house with a lawn which the resident believes to be an ideal place of living. This image is like a calling card of a resident. There is a mailbox standing next to the house and an advertising board for those who pass by. The first page is like a photo of a real house with adjacent territory. Most or some elements of this dream house are interactive. For example, the entrance door is taken from a three-dimensional (3D) catalogue of a certain door manufacturer. All three-dimensional (3D) catalogues of items hosted on the platform in the form of databases are created using a technology for creating 3D images based on the photos of real objects. Any user can assess the resident's ideal house. If a user likes something in the house, for example, the entrance door, by clicking on it the user can download a 3D model of this door into the library of 3D doors of his homepage. A click on the façade will display the images of façade painting options. Later the user will be able to use this 3D door to "build" its own house or to receive other 3D models of this manufacturer via an authorized agent.

Figure 2:
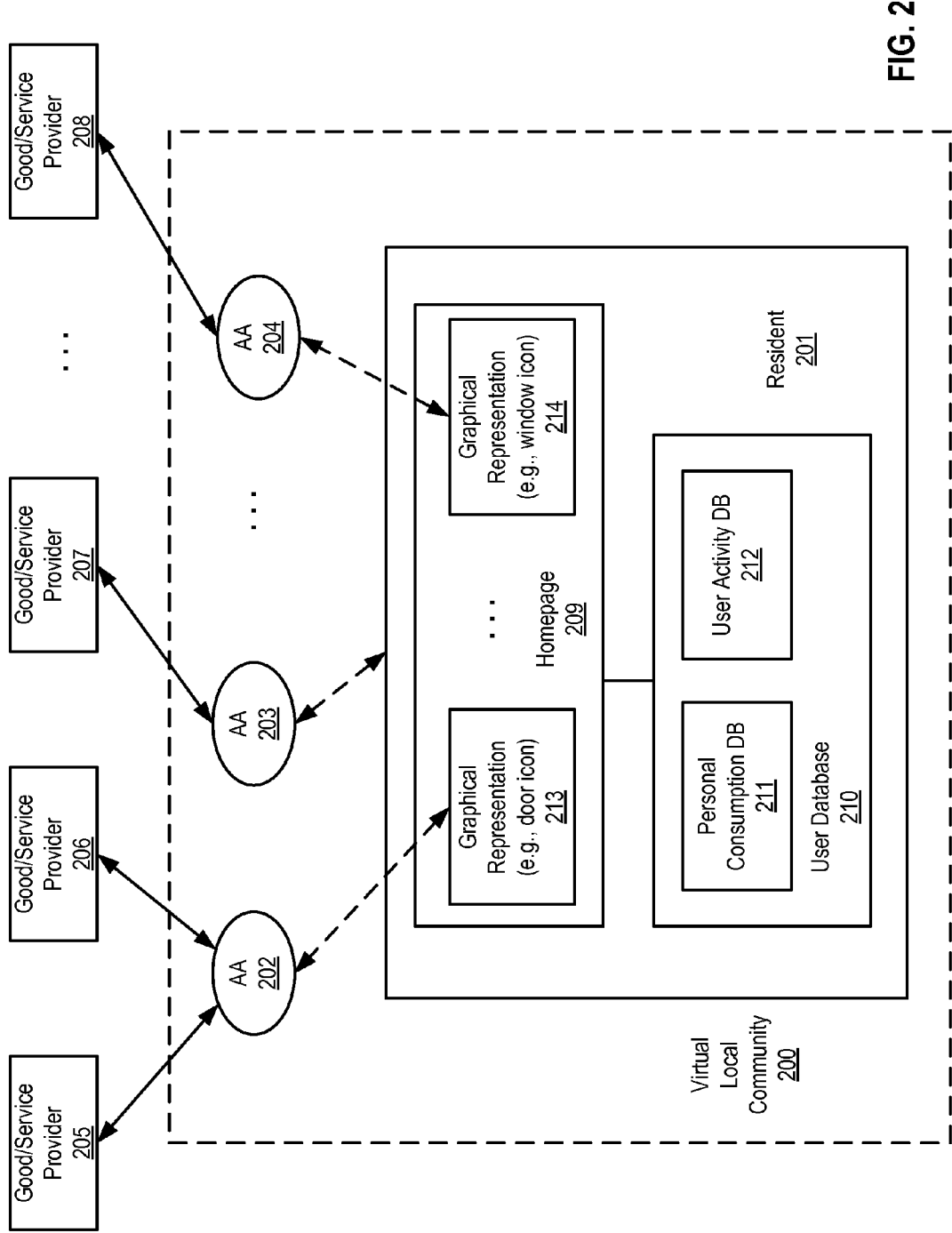
FIG. 2 is a block diagram illustrating a virtual local community according to one embodiment of the invention.

FIG. 2 is a block diagram illustrating a virtual local community according to one embodiment of the invention. Referring to FIG. 2, virtual local community 200 may represent any of virtual local communities 107-108 of FIG. 1. In this example, although only resident 201 is shown for the purpose of illustration, more residents may be associated with virtual local community 200. In one embodiment, resident 201 includes a 3D homepage 209 having items representing goods or services that resident 201 owns. Some of the items are displayed associated with graphical representations 213-214, which may be a reduced resolution image or icon. The items within 3D homepage 209 are 3D models of real objects from the platform's catalogue created using a technology for creating 3D images based on the photos of real objects. These objects resemble the actual items owned by resident 201 in its actual home in a geographical area corresponding to virtual local community 200. Resident 201 is also associated with user database 210, which may be implemented in a single or multiple databases, alone or shared with other residents. User database 210 includes personal consumption database 211 and user activity database 212. Consumption database 211 is used to store information concerning items displayed in 3D homepage 209 representing the goods and service consumption of resident 201. User activity database 212 is used to record user interaction (e.g., purchases) via the platform. As a result, one can search database 210 to determine the goods and service consumption patterns or trends of resident 201. The information obtained from database 210 may be anonymous information without exposing identities or sensitive information of the associated residents.

In addition, according to one embodiment, authorized agents 202-204 are associated with virtual local community 200. An authorized agent may be developed by a third-party entity (e.g., third-party entrepreneur 105 of FIG. 1) that is different from a goods/service provider. An authorized agent represents residents of a virtual community to collectively purchase or acquire goods or services from a goods/service provider such as goods/service providers 205-208. An authorized agent has to be authorized or approved by a majority of the residents of a virtual local community in order to be available within that virtual local community. For example, at least 10% of the residents have to approve in order to allow an agent to operate or install within the community. Each authorized agent is associated with one or more providers of one type of goods/service. An authorized agent can utilize the collective purchasing power to purchase or acquire goods or services for a better price on behalf of the residents. That is, each item of goods ordered by an agent from a manufacturer has a concrete receiver who is a resident. A resident who utilizes an authorized agent gets goods at a manufacturer's price lower than the price obtained through middlemen such as resellers and may be rewarded with ownership shares of the authorized agent and dividends on the shares of an authorized agent owned by him, as shown in FIG. 3.

Figure 3:
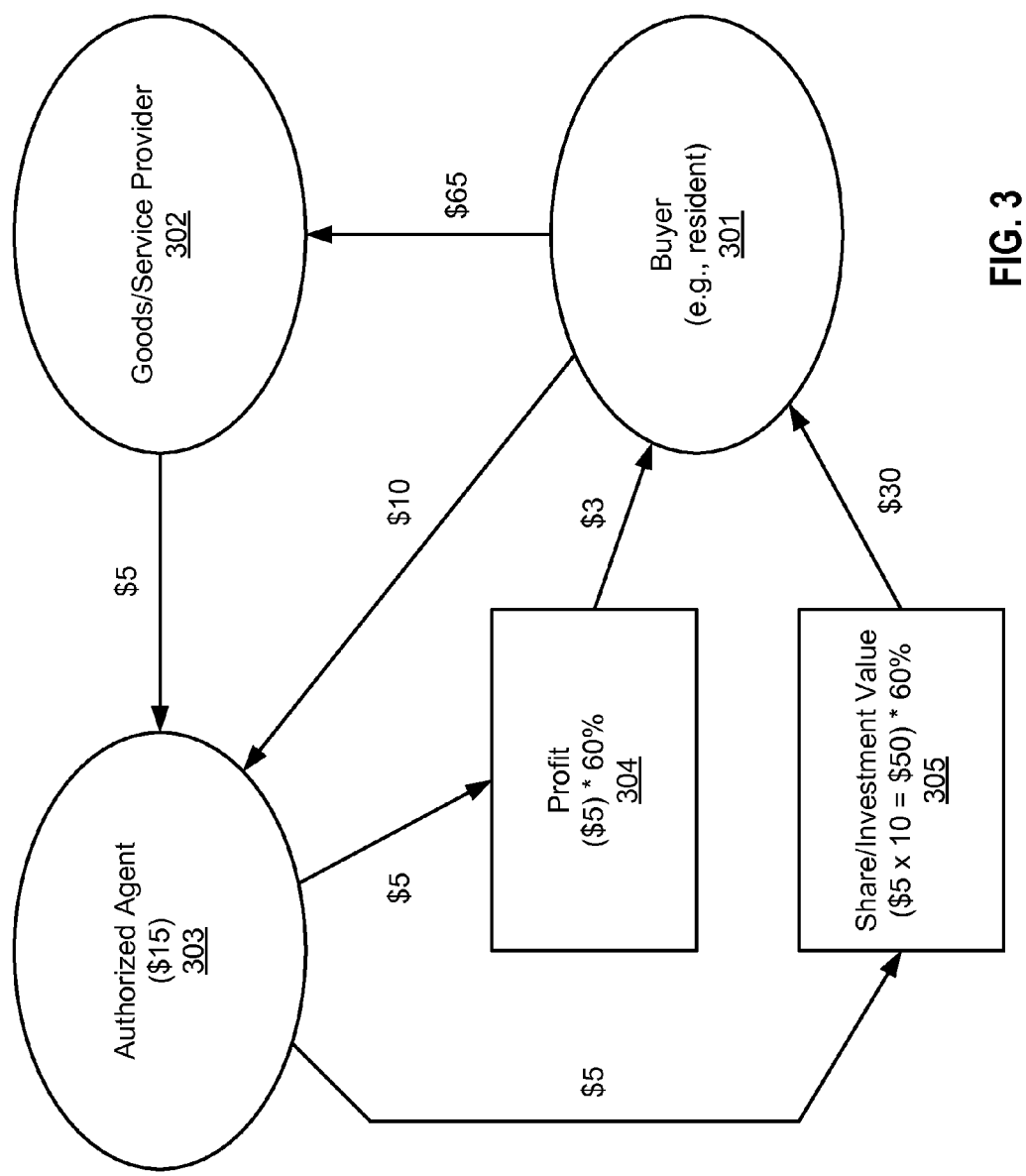
FIG. 3 is a block diagram illustrating profit sharing amongst parties according to one embodiment of the invention.

Referring to FIG. 3, buyer (e.g., a resident) 301 can invoke authorized agent 303 to reach goods/service provider 302, for example, when the resident clicks on an item of its homepage. It is assumed that authorized agent 303 has been approved and authorized by resident 301, where authorized agent 303 represents residents of a local community have a commercial relationship with goods/service provider 302 at a predetermined cost formula. In this example, it is assumed that buyer 301 pays, via the associated account from its credit union set up within the community, a total $75 to complete the transaction according to a predefined formula, in which $65 is paid to goods/service provider 302 and $10 is paid to authorized agent 303. Since authorized agent 303 brings business to goods/service provider 302, goods/service provider 302 rewards a kickback of $5 to authorized agent 303 for administering databases of the goods provider 302. This amount is paid by all providers and is not connected to a certain purchase, for provider 302 it is a marketing expense. As a result, authorized agent 303 receives a profit of $5 (assuming the cost for authorized agent 303 is $10). A portion of the profit is then allocated back to buyer 301 according to a predetermined formula 304 (in this example, 60%). In addition, the cost of the ownership shares allocated to buyer 301 is adjusted according to a predetermined formula 305.

Referring back to FIG. 2, a resident's dream home is not just a beautiful picture. It is a model of a real house having certain dimensions designed by an architect. The model of a house for the homepage can be ordered from an architect or taken from the platform's catalogues similar to selecting a design from the catalogue of an architectural firm. By clicking on the homepage a user can get contacts of the project architect and contact him and order a design of a real house. The starting and the following pages of the home allow a resident to make a virtual tour around his ideal house. For example, he can change furnishing and objects; he can put clothes into the closet and open the fridge. All objects, products are interactive 3D images of real products that he bought/going to buy in reality via authorized agents. A resident can contact an authorized agent by clicking on the image of a real object in his ideal home.

For example, a resident opens the bathroom page and clicks on an image (e.g., 3D image) of the toothpaste. This click connects the resident to an authorized agent which he used to make his last purchase and provides a list of alternative authorized agents. The resident may choose to re-order his toothpaste through the last authorized agent or select a new authorized agent. Alternatively, the resident opens a bathroom page and sees a blinking 3D image of the toothpaste meaning that the authorized agent has some new information for him on the toothpastes or other useful information. The resident may reject the proposal with a click or view the information on the new toothpastes. Viewing the information makes the resident's activity index (stored in user activity database 212) increased.

According to one embodiment, every product/service has an authorized agent associated to it in every virtual local community. By placing an image from the platform's catalogues in his ideal home a resident automatically establishes connection with the authorized agent in its community. Later the resident interacts with the authorized agent by clicking on the 3D images on the homepage. To open a homepage, one has to enter the resident's identifier or username. External users can study and evaluate the images of homes on the residents' homepages having zip codes of real cities around the world. The image of a home is like a resident's "calling card." Information on the shareholding structure of the authorized agents is also included in the registration databases (not shown). Using various methods or algorithms for processing the databases created on the platform different functions of social/commercial/information and other types are implemented.

A home interface (e.g., home page) is designed to create a personal database of a resident according to the platform's rules. A Home is opened when a browser of a resident is launched to access the platform. The homepage of the home can be viewed by the external users. According to one embodiment, a home page interface includes some fields where a resident owning this Home can place, such as, for example, a piece of his favorite song/music or a movie, a piece of news that is mostly interesting to him, a limited number of logos of the companies he likes—his favorite companies (where the administrator of the Platform updates the types of companies from time to time), his ideas/proposals on new goods/services that he would like to see on sale. It forms databases available for analysis of all the residents. For example, one can find out what music or news is most popular today in San Francisco. On the platform, any personal information of a resident is considered as information for anonymous databases available for analysis of the Residents themselves.

According to one embodiment, there are one or more fields to place the above information on the main home page. Together they are called the home advertisement board. The home layout is a 3D model of an individual residential house. A resident can select the 3D model from the platform's catalogue or order an individual design. A resident can change the design of his home (layouts, appearance) any time. All image elements are interactive and correspond to the manufacturers' catalogues, such as, for example, facades, windows, doors, engineering equipment, etc. For example, a wallpaper image corresponds to real wallpaper from a catalogue of a wallpaper manufacturer. The information on the wallpaper that the residents choose is recorded in the platform's databases. The more interactive elements a resident places in the rooms of his home, the better are the prices that resident can get in the future, for example, when the resident decides to change his wallpaper. In the home interface, a resident has an opportunity to open a 3D model of a fridge and to put 3D food products on the shelves of the fridge. A click on every food product in the fridge will open a window with its parameters and will automatically send an order to the authorized agent for its purchase and an order to the credit union for the payment.

The home interface allows every resident to create its own databases containing information about its consumption and establish interactive connection with the manufacturers of goods, services, information, and other content. A resident enters information in the form of visual images. A resident places objects that he has or that he would like to purchase in the future. A resident takes objects or services to be placed in his home from the platform's catalogues. The platform's databases of goods/services are made of 3D models corresponding to articles of the manufacturers' catalogues. According to one embodiment, 3D models in the platform's catalogues are made using a technology for creating three-dimensional images based on the photos of real objects. Databases of 3D goods/services are administered and placed on the platform by the authorized agents or companies. In order to create a 3D model databases (e.g., a three-dimensional image created based on the photos of a real object), the authorized agents use these manufacturers' databases in the format of the platform's databases. The task of a resident is to place in his home the maximum number of objects or items and services that he uses and plans to purchase in the future. The objects or items resemble the actual goods the resident consumes in its actual home. The quantity of objects/services and planned purchases placed in the home is taken into account for calculation of the resident's activity index.

A home interface allows residents to analyze in different ways the platform's databases formed by the residents without disclosing personal data of the residents. A home interface implements algorithms of different types related to purchases of goods/service as well as to the social interaction of residents. Users not registered on the platform can view the main homepages only and they can also sort the homes by the geographical areas they are registered in. Residents can provide the access to other pages of their home pages by issuing individual guest passwords. A home contains a package of interfaces implementing different telecommunication functions: audio/video telephone, chat, email, web mailing and other. All types of communications are carried out via the home interface without limitations, except for sending emails from an external user not registered on the Platform to a resident. To send such an email an external, according to one embodiment, an external user must get a temporary automatic registration on the platform for a limited period of time.

According to one embodiment, a homepage contains an interface allowing a resident to make queries for analysis of the platform's databases (e.g., search facility 110 of FIG. 1). The search system algorithms are based on selecting the key parameters related to the location of the web site owner or the content source. For conventional search systems the main parameters are: query processing speed, volume of the indexed information, geographical location of the query source, language the information is written in. The main difference of the platform's search system is that it processes the databases structured according to the platform's rules only.

In one embodiment, the search system interface includes four types of fields. Field type 1 is designed for entering the following types of information that will limit the data selection: location of the owners of the web pages: a country/a group of countries; a city/a group of cities; login name of the platform user, the company type, the unique company name. Field type 2 is designed for entering the key words in free format. Field type 3 is designed for entering the rating parameter of the web pages participating in the selection. The web pages rating can be set up using the following parameters: favorite web sites that are viewed most often, favorite web sites that most users liked, popularity coefficient, e.g., the percent of users who assessed the web pages in the positive from the total quantity of users who viewed the page, negative assessment coefficient—e.g., the percent of users who assessed the web pages in the negative from the total quantity of users who viewed the page. When a resident generates a search query, the resident may enter several parameters in any combination to place the web pages he found in the parameter ascending or descending order.

According to one embodiment, a resident assesses or rank a web site when he closes the page. One of the options of closing a page is to use one of three assessment buttons on the page tab of the platform's page. A first button corresponds to "positive" assessment. A second button represents "negative" assessment. A third button represents "neutral" assessment. The number of assessments of the closed pages is included into the resident's activity index. The administrator of the platform determines the algorithm for its calculation. The resident's activity index is taken into consideration for calculating the number of shares of the authorized companies owned by the resident. This method of closing browser pages is noted on the platform as user evaluation of the web site open on the web site page. Field type 4 is designed for processing the platform's goods/services/knowledge databases. It allows a resident to receive analytical information, such as product popularity by cities/groups of cities, rating assessment of a product by the residents, comparative information on similar products, and to find authorized companies representing the product of interest in different geographical areas.

Referring back to FIG. 2, in this example, it is assumed that homepage 209 has been configured by resident 201 to associate authorized agents 202-204 with certain graphical representations 213-214 representing the items or goods displayed as part of homepage. When a user, either resident 201 itself or an external user, activates a graphical representation (e.g., graphical representation 213), an authorized agent (e.g., authorized agent 202) associated with the activated graphical representation is invoked, which links the user to one or more goods/service providers (e.g., goods/service providers 205-206 in this example). The user can examine, inquire, and purchase goods or services from the associated goods/service providers via the corresponding authorized agent.

When an authorized agent registers with the platform to be associated with a particular community, he gets an opportunity to arrange a deal to purchase particular goods or services from a particular goods/service provider if the residents agree to authorize the authorized agent to be part of the platform. The authorized agent utilizes the collective bargaining power (of multiple residents) to achieve a mutually beneficial business relationship between the authorized agent and the manufacturers. A resident who utilizes the authorized agent may get a better price without having to pay the middlemen such as resellers when making a purchase. Payment of the purchase may be drawn from the residents' credit union accounts and paid to the associated authorized agent. The authorized agent in turn pays the manufacturer. In addition, the ownership shares of the authorized agent of the resident may also be adjusted, as shown in FIG. 3.

The platform is aimed to collect information to the benefit of the residents themselves, including creating and updating the database of residents' individual consumption of goods/services, analysis of databases of consumption of all users registered on the platform, analysis of news and knowledge databases as well as other types of databases created by the users, analysis of databases of goods/services of all manufacturers registered on the platform, exchange of information between the registered users and registered manufacturers of goods/services, purchases from the manufacturers of goods/services, organization of financial transactions of the users, selection of the type of his/her personal commercial activity and organization of this activity, deriving revenues from using Internet resources without carrying out commercial operations, and creating investment value of the home of a resident.

According to one embodiment, multiple residents of a community receive free of charge some or most of the shares of the authorized agents the services of which they use. Every user has a share in the stock yield of the authorized agents. This share has a fixed part and a variable part depending on the activity index of a resident on the platform. Thus, after the registration on the platform a resident automatically becomes collective co-owner of the authorized agent's shares. A resident may partially sell the share of his home in the stock yield of an authorized agent to an investor.

The platform is designed to infinitely expand the functionalities available on the platform via authorized agents or companies. The platform is able to integrate computer software designed by independent software developers (e.g., third-party entrepreneurs 105 of FIG. 1) implementing different algorithms of interaction between the platform's users living in one or several geographical areas and manufacturers of goods/services/information/knowledge and other types of content as well as between the platform's users themselves. Such software depicts the algorithms of interaction between the platform's databases, consumer databases created by the residents, and databases of the manufacturers of goods/services/information/knowledge and other types of content.

According to one embodiment, an authorized agent owns the title in the algorithm designed. The developer of the algorithms owns the title in a certain number of shares of the authorized agent implementing this algorithm as a paid service on the platform. In order to organize the authorized agent's business, the developer of the algorithm may use his shares to attract partners or investors. A standard seller approaches a manufacturer with an offer to sell their produce. An authorized agent appointed by the residents approaches a manufacturer as a representative of a certain part of the population of one of the geographical areas. An authorized agent that got a certain rating at year-end among the platform's users as per the quality of its services and financial performance in its community is able to get access to doing business through the platform in other geographical area of the world.

Before being integrated into the platform, according to one embodiment, every algorithm has to be certified (approved) by the residents living in the same settlement whose databases are to be available for processing by this algorithm. For example, a businessman intends to organize a purchase of irons for the residents of a certain district of San Francisco. He has a proposal for the residents of this district on how to do it in the most beneficial and comfortable way for them. He goes to the platform's administrator of this district with this proposal. The administrator sends the proposal to the residents. If the businessman's proposal receives a positive response from the residents, the businessman will register an authorized agent on the platform. The way of purchasing the irons will be formalized on the platform as a computer program and an authorized agent web site.

In order to buy an iron, the residents of this district of San Francisco will need to click on the image of an iron on the housekeeping area page of the home. Such a click will establish a connection with the specialized authorized agent dealing with irons. The authorized agent according to its algorithm will render assistance in selecting the optimal model for the resident(s). Afterwards, the authorized agent sends the collective order for the purchase of irons from the residents of this district of San Francisco to the manufacturer. In 3-5 days the manufacturer ships irons directly to the end-customers in San Francisco. In this example, the authorized agent arranges an interaction between the iron demand databases formed by the residents of one of San Francisco districts and manufacturers' databases of iron. Note that the manufacturers are not part of the platform. Manufacturers are interested in selling their products to the residents should create 3D electronic catalogues of their products in the platform's format. A manufacturer provides its product database to be included into the platform databases. The platform's 3D databases are indexed by the authorized agents selling corresponding products.

Alternatively, an authorized agent can initiate a creation of a 3D image database by a manufacturer to be included into the platform databases. It is assumed that there are ten authorized agents specialized in irons in San Francisco. For a manufacturer of irons, these ten authorized agents represent a collective buyer representing the most part of San Francisco population. There are 300 authorized agents specialized in irons in 300 cities that provide for the demand for irons of the most part of the US population. The platform offers an opportunity to make purchases directly from the manufacturer using the services of the authorized agents in every city. At the year-end, every authorized agent receives its rating from the residents of the real city it operates in. If the rating is lower than a predetermined threshold, the authorized agent may be removed from the platform. This helps maintain the quality level in every city. An authorized agent places on the platform databases of a manufacturer of goods, services, information, and knowledge according to the rules of the Platform and using its algorithm administers their interaction with the residents' databases.

Evolutionary development of the algorithms functioning on the platform takes place on the basis of the principles of competitiveness. Every type of service is being implemented using several algorithms belonging to different authorized agents. The authorized agents act on behalf of the buyers. An authorized agent gets a chance to operate on the platform in the event it gets permission from the buyers. Based on its rating a certain authorized agent can be removed from the platform. The platform performs for the residents the function of rating evaluation of the authorized company at year-end. For example, authorized agents may receive ratings based on a number of factors: the number of residents they provided services to, earnings per share, share value dynamics at year-end. The authorized agents with the lowest ratings lose the status of an authorized agent. Integration of the software implementing different algorithms may be carried out on a paid-fee basis. An authorized agent makes regular payments to the administrator of the platform for placing its databases on the platform.

According to one embodiment, the administrator of the platform may define certain types of the platform's services as the "exclusive services." Methods or algorithms of the exclusive services can belong only to the authorized agents whose shares are owned only by the residents and the administrator of the platform. Such authorized agents are hereinafter referred to as the "exclusives authorized agents." The difference between a regular authorized agent and an exclusive authorized agent is in the types of activities and in the form of share distribution. In one embodiment, the platform's administrator determines the types of activities for the exclusive authorized agents. Such activities for the most part are not associated with the specific character of a certain geographical area. They may be free for the residents or these activities should be the same for all residents. Shares of an exclusive authorized agent can be owned only by the residents and administrator. Shares of a regular authorized agent can be owned by the residents, administrator, and creator or investor of the regular authorized agent. The administrator of the platform determines how the shares of the exclusive authorized agents will be distributed among the residents and the administrator of the platform. For example, when the administrator registers an exclusive authorized agent, it may transfer 60% shares to the platform's trust fund for free. The beneficiary of the trust fund is the credit union of the platform. As per its legal form, the credit union is owned by the multiple residents. Thus, the ultimate beneficiaries of the exclusive authorized agent are the administrator and the multiple residents.

The exclusive services provided on the platform via the exclusive authorized agents include, for example, financial, advertising, telecommunication, insurance, post and other services. The shareholding structure in an exclusive authorized agent can look as follows in one of the instances: residents—60% shares, the administrator of the platform—40% shares. Note that on the platform, the sales revenues are not being distributed between the platform and an authorized agent. The residents and the platform own only the shares of an authorized agent. In order to implement their algorithms on the platform the exclusive authorized agents use the software designed by independent software developers with an open source code or API.

For example, an exclusive financial company (e.g., the credit union) owns 60% shares of a payment system and a credit broker. These two entities or companies are part of the credit union group and belong to the exclusive financial company type. The payment system performs settlement functions when the residents make their purchases. The credit broker acts to the benefit of a resident having an account in the credit union. It renders services related to provision of credits by one resident to the other. The credit broker formalizes relations between them, for example, determining the maximum possible interest rate and other parameters. A borrower and a lender get a chance to determine or to change the credit terms and conditions at their own discretion using the credit union's tools.

An exclusive financial company belonging to the group of companies of the platform's credit union implements financial algorithms on the platform. Assets of the credit union are mainly used to provide financing to the residents via services of the exclusive financial company to enable them to make purchases generally from the authorized companies. The exclusive financial company implements the algorithms of payment for purchases and direct crediting algorithms. The direct crediting algorithm allows for direct interaction between a resident lender and a resident borrower via the exclusive financial company. The exclusive financial company determines the limits of possible amendment of terms and conditions of the provided loan which a lender and a borrower may change during the loan repayment term.

Another example of an exclusive authorized agent is an exclusive telephone company (which has the same functions as any other Internet call service). Its shares belong only to the residents and the administrator. A particular feature of the exclusive telephone company interface includes the rules of showing the information when establishing/releasing a connection. An exclusive telephone company is a free service for the residents when they are telecommunicating via the Internet. The interface of this service is integrated in the home's interface. When the connection is established, every person who participates in the conversation sees the image of the home of the person he/she is talking to. When the connection is released, every resident sees the favorite company of the person he is talking to included in his homepage.

Another example of an exclusive authorized agent is an exclusive post company (e.g., the platform's mail software allows sending messages between the residents, as well as between the residents and the Internet users not registered on the platform). Other mail programs usually allow creating different groupings based on a limited number of parameters: sender's name, send/receive date/time, subject, and priority. The platform provides an opportunity to deeper differentiate the messages using the platform's registration parameters. An important property of the platform's mail program is that it registers on the platform all advertising/marketing messages received and viewed by the resident.

For example, the mail program automatically distributes all incoming messages into three types: from individuals, from companies, advertising/marketing. Incoming mail is grouped according to the city the sender lives in. For example, a mail web page interface has three columns corresponding to three types of messages: individuals, companies, and advertising/marketing. In the column grouping together messages from the individuals, names of the cities with the number of unread messages are shown vertically. A click on the column name opens messages as a list. A click on the city name opens the list of messages from this city. Advertising/marketing column allows subscribing for information on a certain goods category from an authorized agent. The number of subscriptions and views of information received by a resident in this mail box is registered to determine the resident's activity index, which in its turn influences the resident's share in the stock yield of the authorized agent.

An exclusive post company is a free service for the residents. The service interface is integrated in the homepages of residents. The resident's mailbox distributes the incoming correspondence in different smart boxes depending on the type of the incoming mail. The incoming letters are sorted by the city where the sender lives, by the type of the sender—a resident or an authorized agent, by the information type—"advertisement/marketing." Every letter type has its own smart mailbox. Operation algorithm of the exclusive post company allows attaching a "postage stamp" to an email. A postage stamp is a logo of a favorite company of the email sender and a two-dimensional (2D) barcode containing information about the favorite company. Opening of the QR code is registered by the platform's mail program as the evidence confirming that the information was reviewed that increases the resident's activity index. Opening of the "postage stamp" barcode raises the sender's and the receiver's ratings on the platform.

Another example of an exclusive authorized agent is an exclusive advertising company that implements algorithms related to distribution of the advertising, marketing, and expert opinion information. Such information is being sent if a resident subscribes for a certain type of information. Subscription operates via the home interface by means of 3D images of goods/services or by setting the "advertising" smart mailbox. Note that the subscription operates from a web site located on the platform by means of the platform's mail software, instead of from an external web site. The main difference of the platform subscription is that reviewing the information received in such a way brings dividends on the resident's shares of the exclusive advertising/marketing company.

The dividend depends on the number of subscriptions and the information reviewed. The exclusive advertising/marketing company distributes content among the residents pursuant to a contract with an advertiser. For the information viewed a resident receives benefits from the exclusive advertising/marketing company and dividends on its shares. Subscription can have different categories: advertisement, news or expert information. A resident can change settings for the information by the type of goods/services, by manufacturer, by the city the information is aimed for and by other parameters. The information received under subscription is announced in the marketing information news line. A resident specifies the goal of subscription—a hobby or an intended purchase. The news line in the resident's home is shown as running letters or in another dynamic way. The resident can assess the information block by selecting "positive," "negative," or "neutral" options or provide written comments. The number of subscriptions for information, the number of the information blocks and comments on them are displayed on the "activity of the resident" page and are used to set the rating of the home of the administrator of the platform.

According to one embodiment, a resident can fill in an advertisement board field dedicated to his favorite company. In this case advertisement of the favorite company will be dynamically updated by the algorithms of the exclusive advertising company. During the search queries related to the sorting of homes the results will show the image of the home's homepage and the field of the resident's favorite company from the advertisement board.

According to one embodiment, any resident can register as an agent of an exclusive advertising company. Such a registration of a resident may raise the rating of his home. After the registration as an agent, a resident may gain access to an analysis of the page views of the advertisement received from him by other residents. In the platform's databases the registered agents will be shown as residents ready to provide their comments on a certain type of goods and their rating according to the residents' assessment. An authorized agent pays an advertisement agent a fee or reward after a purchase made with his participation.

In one embodiment, an exclusive advertising company implements algorithms of creation of expert communities based on different types of goods/services and on the basis of such communities forms open knowledge databases similar to the wiki websites. The platform's means are oriented at: first, creation by authorized agents of the expert opinion based on the residents' opinions; second, customer influence on the quality of goods/services. The goal of the authorized agents is to represent the collective interests by putting together objective information on a provider or services/goods in a comfortable way and with maximum details. For example, an authorized agent's information on the coffee shops in San Diego: residents of district . . . prefer coffee shop XXX, 70% visitors give it the highest score, particular feature—a special coffee grade AAA with the taste of . . . You will be lucky is John makes your cup of coffee. This week he works on Mon, Tue, Wed. after 4 p.m. Bear in mind that on Friday after 5 p.m. it is difficult to find a place there. And a lot of other extra information based on the customers' reviews. You can send a message to John or call Bill from the AC. He will advise where it is better to have a cup of coffee at this time.

In another example, an authorized agent specialized in laundry services in San Diego based on the residents' reviews can discuss with the management of the company providing laundry services on behalf of the residents how to improve their relations with the customers, including proposals on substitution of inattentive employees. If the management of the company does not take any action on improving the quality of their services, the authorized agent can advise the residents to use services of another company more attentive to their customers.

An exclusive advertising company pays from its own revenues for the services of the authorized information companies which are mass media. The amount of financing received by each authorized information company depends on its rating calculated on the basis the residents' assessments and number of subscribers.

According to another embodiment, registration of a resident on the platform is carried out by means of freeware distribution of free advertisement management software (also referred to as content management software) by the platform's administrator among the Internet users. The software represents a supplement or plug-in to a variety of browser applications, such as Mozilla's Firefox, Google's Chrome, Apple's Safari, Microsoft's Internet Explorer, etc. This type of browser software supplements may be distributed via a Web site of the browser owner. Advertisement management software may be distributed under an open source and free software license.

Figure 7:
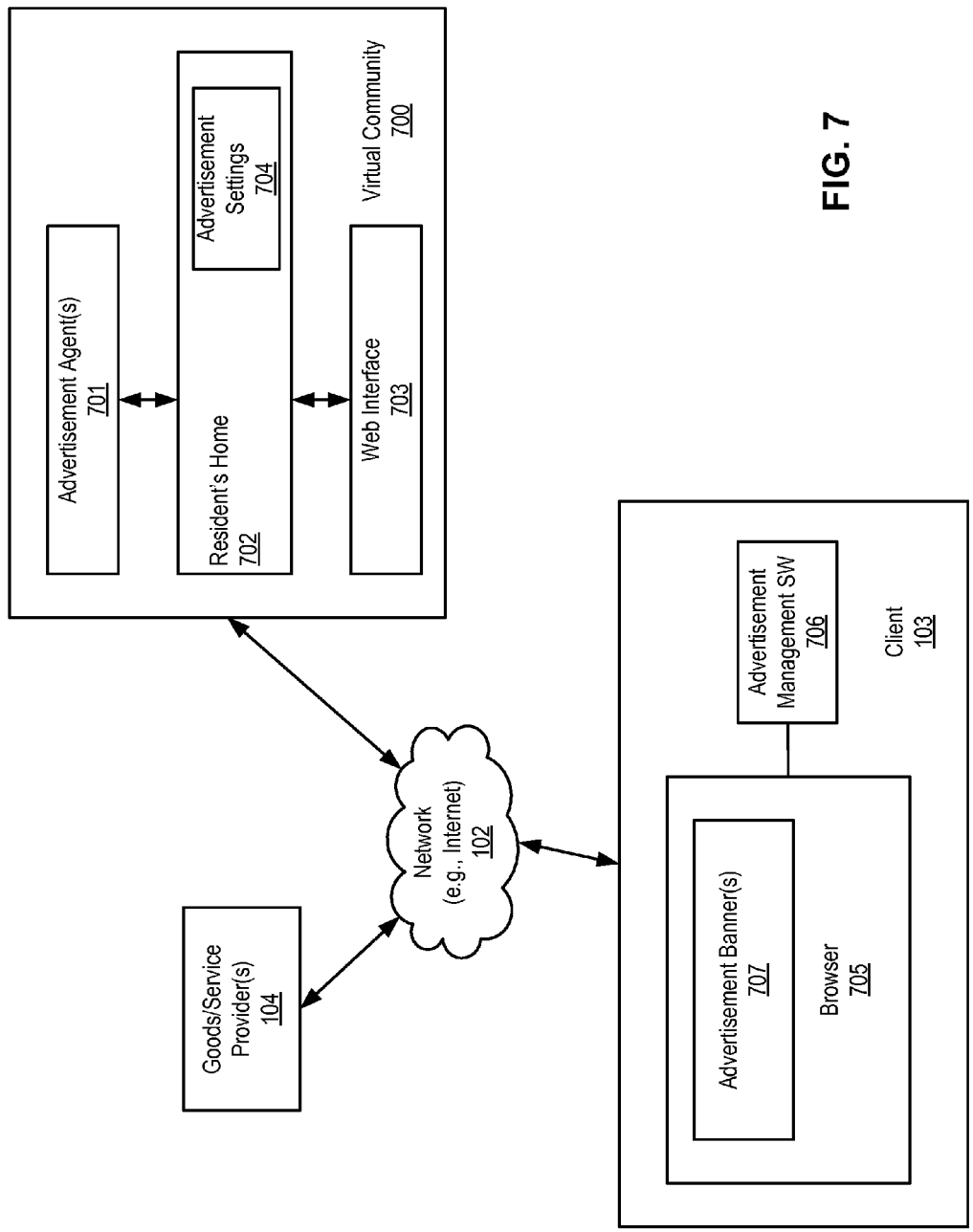
FIG. 7 is a block diagram illustrating an advertisement system of a virtual community according to one embodiment of the invention.

FIG. 7 is a block diagram illustrating an advertisement system according to one embodiment of the invention. Referring to FIG. 7, advertisement management software 706 can be downloaded from the platform and installed at client machine 103, where advertisement management software 706 may be communicatively coupled to a browser 705, similar to a browser plug-in. In this example, a resident associated with resident's home 702 operates remotely at client 103 that logs into the platform and communicates with resident's home 702 via Web interface 703. According to one embodiment, advertisement management software 706 is to communicate with resident's home 702 and/or advertisement agent(s) 701 of virtual community 700 via Web interface 703.

When downloading the advertisement management software 706, the downloading software redirects a user to the platform's registration Web page. Registration Web page interface allows a user to register as a co-owner of an exclusive advertisement company 701 and as a resident of the platform. Supplementary advertisement management software 706 for browsers such as browser 705 blocking advertisement on web sites is most popular among users. For example, Mozilla's Firefox advertisement blocking supplement has 100,000 downloads per day on the average. Taking into account the fact that the market share of this browser is around 20%, the potential audience of the advertisement management software 706 is around 300,000 downloads per day or around 100 million per year. According to one embodiment, the advertisement management software supplement 706 includes the following major functions:

Deleting (blocking) advertising information when viewing the Internet web sites;
Personal user subscription for a certain type of advertising/marketing information (hereinafter referred to as the "banners") downloaded from a home into the memory of a user's computer or an Internet access device;
Viewing banners downloaded from a home in online/offline modes in the browser window;
User management of the interactive banners downloaded on a computer.

Using settings 704 in the home interface a resident can specify the type of goods/services he is currently interested in receiving information on in the form of banners 707 from advertisers. Depending on the resident's settings 704 the information in the form of banners 707 may be downloaded by the advertisement management software 706 into the memory of the resident's computer 103 at a user configurable schedule (e.g., every hour) in the background. Using settings 704 in the home advertising/marketing mailbox a resident can specify the volume of the information in Mbytes he/she receives. When the amount of information exceeds this predetermined volume, the new information will replace the old information.

According to one embodiment, the advertisement management software 706 allows a user to view the downloaded banners 707 in a browser window online or offline. When viewing the banners online, according to one embodiment, part of the browser window in the form of a view bar to the left or to the right (hereinafter, referred to herein as a "view bar," is used to show the banners. The banners 707 may be displayed in a stack, one above another as a vertical bar or in another way. When a user opens a new browser session or tab, banners in the view bar are updated. Information concerning the total number of banners downloaded into the memory of a PC/an Internet access device, the number of banners viewed, and various activity statistical data of a resident on utilization of the advertisement management software 706 are shown in the view bar. When viewing the banners offline, the view bar fills the entire browser window. In this viewing mode, the banners are placed one above the other in several vertical bars. The price of a click paid by the advertiser and other parameters may be shown on every banner.

Management by users of the interactive banners implies that the downloaded banners have certain interactive properties and a unique number. With a click on a banner in the view bar a user can: delete it from the memory, lay aside to view later, go to the advertiser's website (e.g., Web site 104), send the banner to another user, write his request/opinion for the advertiser, specify the price at which he is ready to buy the goods/services advertised on the banner, and other functional opportunities.

According to one embodiment, a banner includes a front side (e.g., first page) and/or a back side (e.g., second page). A resident can open the front or back side of a banner with a click. The front side of a banner includes advertising information on it. The back side of a banner is dedicated to additional or detailed information of an advertiser and to users' requests/opinions with regard to the front side of the banner. Users' requests/opinions written on the back side of a banner are collected by an exclusive advertisement company and forwarded via specialized authorized companies to advertisers. A resident can personalize a banner he received. This advertisement management software function assigns user's login on the platform to the banner downloaded into the memory of a user's computer. A user can send the personalized banner to another user.

Utilizing the opportunity to place information on the back side of a banner, banners allow arranging different game configurations for users that are financed by the advertisers. Examples of the game configurations are as follows:

"Prize"—the back side of a banner may contain information on a money prize or a discount to purchase goods/services.

"Friends' Banner"—the back side of a banner may contain the amount of logins of the users who viewed this banner, for example, during 24 hours. The banner viewed by the maximum amount of residents gets a prize from the advertiser.

"Quick Banner"—the back side of a banner may contain information on the distance between the users who viewed this banner. The banner with the highest speed (defined by the time from the first view to the last view and the sum of distances between the cities where the users who viewed the banner live) receives a prize from the advertiser.

"Puzzle"—the back side of a banner may contain a piece of an image. After a user collects all pieces of the image he receives a prize from the advertiser.

Different game configurations may be developed by independent developers and placed on the Web page of the exclusive advertisement company on the platform. Advertisers have an opportunity to choose one of the game algorithms for their advertising campaign. Viewing, assessing and other actions of a resident associated with processing the banners downloaded to his/her computer are forwarded by the advertisement management software in the background mode via the home website to the databases of the platform's administrator.

Activity of a resident in using the advertisement management software is taken into account for the calculation of the resident's activity index. A resident's income from the ownership shares of an exclusive advertisement company has a fixed component and a variable component, which depend on the resident's activity index. An exclusive advertisement company derives income from providing advertisers with services on distribution of targeted advertising among the residents.

Advertisement management software differs radically from other software existing on the market, such as, for example, AdBlock, Adblock Plus, etc., as they only block the advertisements when viewing websites. Uniqueness of the advertisement management software is that besides blocking the advertisements on the websites, it creates a personal interactive channel allowing users to manage their interaction with advertisers by themselves.

A resident's asset is its home. According to one embodiment, it has an investment value which is defined by the cost of shares of the authorized/exclusive companies owned by the resident. The resident owns the stocks/shares of the authorized/exclusive companies through the ownership in the shares of the platform's fund. The number of stocks/shares owned by the resident depends on the resident's activity index which is dynamically depicted in the home interface. Multiple residents may receive rights in the most part of the shares of all authorized agents free of charge. The shares owned by a resident are divided into ordinary and special ones, dividends on which depend on the activity index. The investment value of a home is the value of the package of shares of the authorized agents owned by a resident. This figure is calculated on a regular basis and is fixed at the year-end. The algorithm for calculation of a resident's activity index is determined by the administrator of the platform.

According to one embodiment, the following parameters can be used for calculation: money turnover on the platform's credit union account during purchases of goods/services from the authorized agents, money turnover on the platform's credit union account during purchases of goods/services from the companies not registered on the platform. Such a turnover is taken into consideration with reduction factor (e.g., 0.5), activity of user interactions on the assessments of the web sites viewed when using the platform's searching engine, activity of a resident when using services of the exclusive agents, completeness and trustworthiness of information in the home's databases about goods/services that a resident uses in real life and about purchases he plans to make, an activity when placing advertisement on the advertisement board, ideas/proposals on the new services to create the authorized companies, and the number of subscriptions for advertising on a certain type of goods, services, information, and activity of viewing.

According to one embodiment, a resident receives a right in the shares of an authorized/exclusive agent on condition that he uses the services of the agents of this type minimum once (or a certain number of times). A resident has a right to sell a certain percent of shares of an authorized/exclusive agent linked to its home in a certain period of time through the platform's credit union only, for example, in 3 years—up to 10% shares, in 5 years—up to 20% shares, in 10 years—up to 50% shares. The cost of shares of the authorized/exclusive agents is determined by the international stock market.

In order to register shares of authorized/exclusive companies, a resident has to be a member of the platform's credit union and maintain minimal financial activity. Minimal financial activity means that during a year a resident made purchases from authorized/exclusive companies, for example, amounting to $1,000 or the minimum balance on his account in the platform's credit union amounted, for example, to $1,000. The sum of minimal financial activity depends on the geographical area where the resident resides. After the registration, a resident receives a package of actions of the authorized companies for free. When the number of such companies grows, the package of actions, having a real value, grows correspondingly. The activity index is aimed at avoidance of misuse on the part of the users who register on the platform to get actions but do not use the platform's services.

In order to coordinate the residents living in a community, according to one embodiment, the administrator of the platform organizes election of two platform's administrators from the residents living in that community using an "election" algorithm. One platform's administrator is hereinafter referred to as the mayor, the other—the treasurer.

The mayor and the treasurer are elected by rating voting of the residents of the community. The mayor and the treasurer may be paid positions of the platform's administrator employees in a community. The administrator is interested in improvement and creation of new services taking into account the specificity of every community. Such a method of appointment enhances the significance of the platform as a method for representation of interests of the residents living in the same community. The mayor's responsibilities include development of social interaction of the residents and satisfaction of their current demands using the platform's means. The main result of the mayor's administration can be represented by the growing number of authorized companies and residents. The mayor also extends experience of the authorized companies from other communities in his home community; invites the companies in the community to work on the platform; develops the advertisement board function; integrates algorithms of social communication and interaction into the platform. In big communities, there can be several mayors, one per each administrative district. The treasurer's responsibilities include: development of services of an exclusive financial company taking into consideration the residents' initiatives, as well as the authorized companies in his community. The treasurer is the head of the exclusive financial company that depends on the number of the platform's services realized by the authorized companies.

Figure 4:
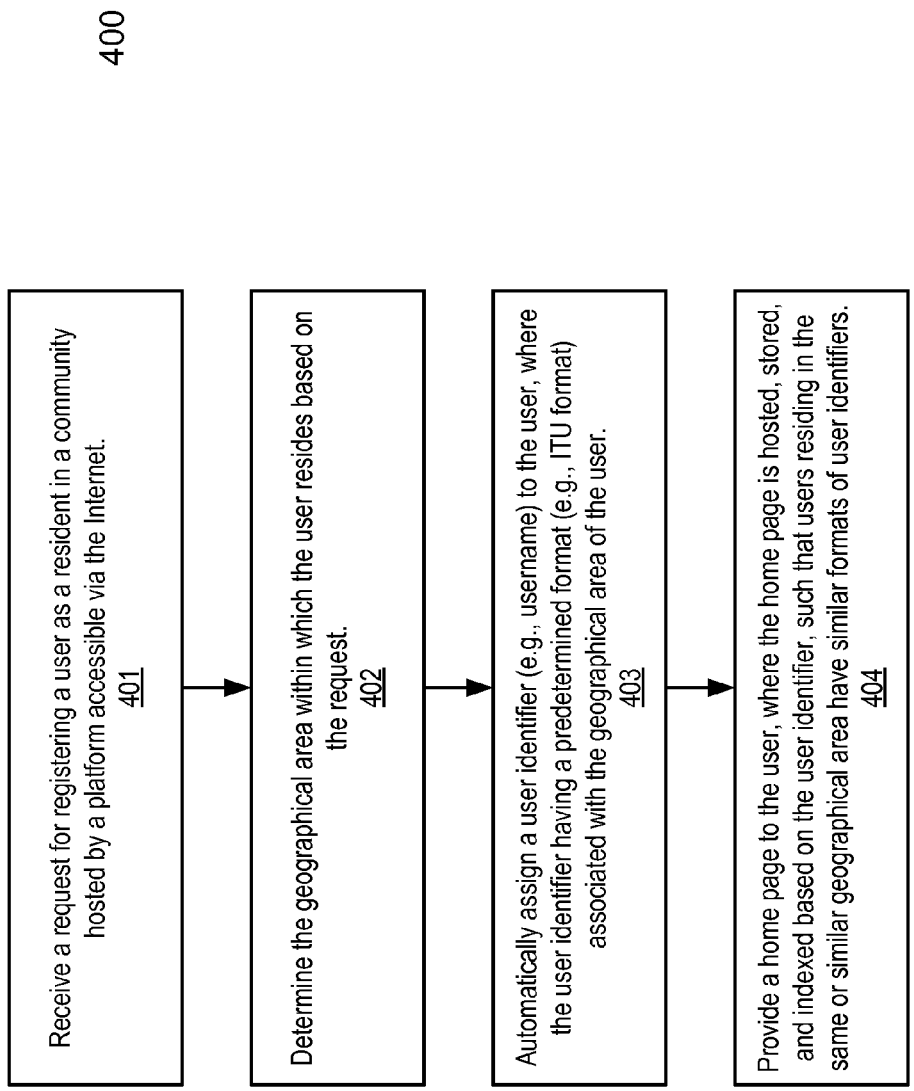
FIG. 4 is a flow diagram illustrating a method for registering a user as a resident in a platform according to one embodiment of the invention.

FIG. 4 is a flow diagram illustrating a method for registering a user as a resident in a platform according to one embodiment of the invention. Method 400 may be performed by processing logic that may include software, hardware, or a combination of both. For example, method 400 may be performed by registration system 109 of FIG. 1. Referring to FIG. 4, at block 401, a request is received at the platform for registering a user as a resident in a community hosted by the platform which is accessible over the Internet. At block 402, processing logic determines the geographical area or location in which the user resides based on the request. In one embodiment, the registration system of the platform may present a graphical user interface (GUI) page to allow the user to enter any necessary information about the user, including specifying a geographical area that the user actually resides. At block 403, based on the geographical area or location of the user, processing logic automatically generates and assigns a user identifier or username to the user, where the user identifier is in a predetermined format associated with the geographical area. In one embodiment, the user identifier includes a geographical indicator or local community identifier that uniquely identifies the geographical area in which the user resides. In one particular embodiment, the user identifier is in a format compatible with ITU format having a country code and an area code that uniquely identify a country and local area (e.g., city) in which the user actually resides. At block 404, a homepage is provided to the newly registered user. The homepage is hosted, stored, and indexed based on the user identifier of the newly registered user, such that users residing in the same or similar geographical area have similar formats of the associated user identifiers.

Figure 5:
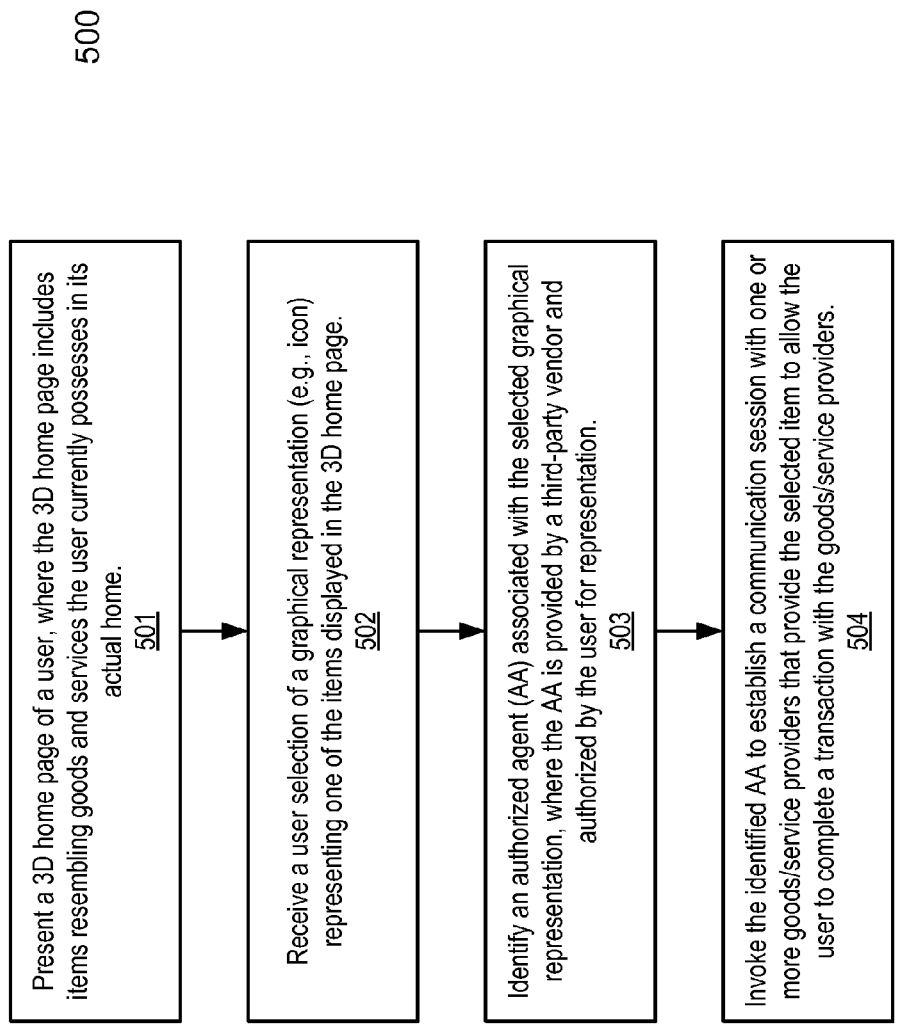
FIG. 5 is a flow diagram illustrating a method for providing a homepage to a registered user according to one embodiment of the invention.

FIG. 5 is a flow diagram illustrating a method for providing a homepage to a registered user according to one embodiment of the invention. Method 500 may be performed by processing logic that may include software, hardware, or a combination of both. For example, method 500 may be performed by platform 101 of FIG. 1. Referring to FIG. 5, at block 501, a 3D homepage is presented to a registered user, where the 3D homepage includes, in one embodiment, 3D models of items created using a technology for creating 3D images based on the photos of real objects the user currently possesses or consumes in its real home. At block 502, a user selection of a graphical representation (e.g., icon or thumbnail) representing one of the items displayed in the 3D homepage. In response to the user selection, block 503, processing logic identifies an authorized agent associated with the selected item, where the authorized agent is provided by a third-party entity and authorized by residents of a virtual local community in which the user is associated with. The authorized agent may be previously installed and associated with the selected item by the user. Block 504 invokes the identified authorized agent to establish a communication session with one or more goods/service providers that provide the selected item to allow the user to complete a transaction with the providers (e.g., purchasing additional items) using funding drawn from its credit union account.

Figure 6:
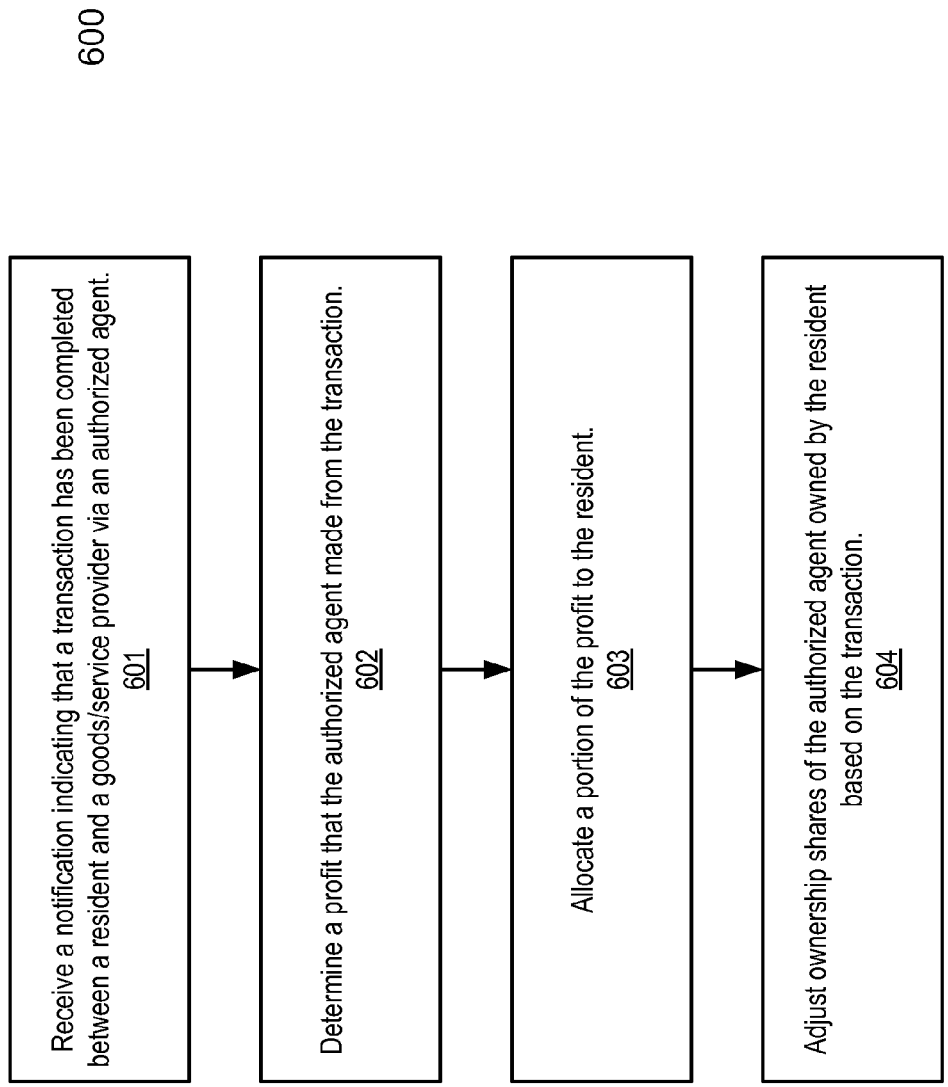
FIG. 6 is a flow diagram illustrating a method for profit sharing between an authorized agent and a registered user according to one embodiment of the invention.

FIG. 6 is a flow diagram illustrating a method for profit sharing between an authorized agent and a registered user according to one embodiment of the invention. Method 600 may be performed by processing logic that may include software, hardware, or a combination of both. For example, method 600 may be performed by platform 101 of FIG. 1. Referring to FIG. 6, at block 601, processing logic receives a notification indicating that a transaction has been completed between a resident of a local community and a goods/service provider via an authorized agent associated with the local community. At block 602, processing logic determines a profit the authorized agent made from the transaction. At block 603, a portion of the profit is allocated to the resident and at block 604, the value of ownership shares of the authorized agent owned by the resident is adjusted based on the transaction.

Figure 8:
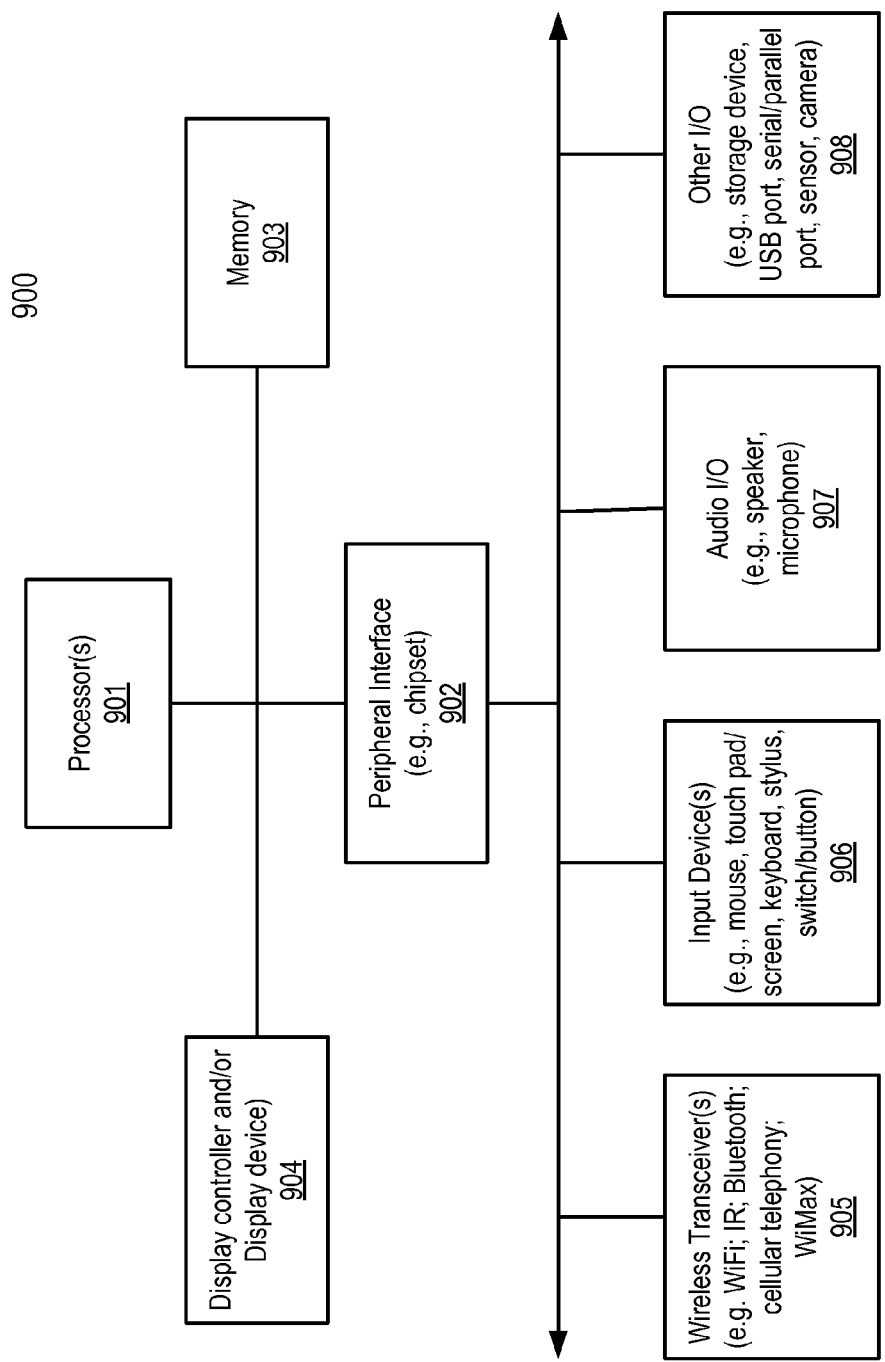
FIG. 8 is a block diagram illustrating an example of a data processing system which may be used with one embodiment of the invention.

FIG. 8 is a block diagram illustrating an example of a data processing system which may be used with one embodiment of the invention. For example, system 900 may represents any of data processing systems described above performing any of the processes or methods described above. System 900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 8, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 8 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
partitioning a plurality of users registered with a social networking platform over the Internet into a plurality of groups of residents based on actual geographical areas in which the users currently reside, each group of residents is associated with a particular geographical area representing a virtual local community, wherein each of the residents in each virtual local community is identified by a resident identifier (ID) which includes a common local community identifier that uniquely identifies the respective geographical area associated with the respective virtual local community;
creating a three-dimensional (3D) homepage for each of the residents in each of the virtual local communities, the 3D homepage representing an actual resident home associated with each resident who actually resides in the associated geographical area, the 3D homepage including a plurality of items decorated with the 3D homepage, wherein the items represent 3D models created using a technology for creating 3D images based on photos of real objects, goods or services owned or incurred by the resident in its respective actual resident home that were purchased or acquired from a plurality of goods and service (goods/service) providers;
associating an authorized agent with at least some of the items decorated in each of the 3D homepages of each virtual local community, an authorized agent being installed and associated with a particular virtual local community at the social networking platform only if a majority of the residents of that particular virtual local community authorizes the authorized agent, wherein each authorized agent is associated with a particular virtual local community and the authorized agent is identified by an authorized agent identifier having a common local community identifier that is associated with that virtual local community, and wherein an authorized agent is linked with a particular goods/service provider over the Internet that provides goods/service to an decorated item in a 3D homepage, wherein the authorized agent is to collectively on behalf of residents of the associated virtual local community to contact the associated goods/service provider for purchasing goods/services associated with the decorated item in the 3D homepage;
storing in one or more databases information concerning decorated items in each 3D homepage of each resident in each virtual local community, wherein the information is anonymous information without exposing identities of the residents;
providing a search interface to allow a user to search in the one or more databases to determine purchasing patterns or habits of residents of a particular virtual local community;
receiving a request from a third-party entity to deploy a first agent in a first virtual local community;
obtaining detailed information from the third-party entity concerning the first agent;
transmitting the detailed information to each resident of the first virtual local community for approval;
receiving an approval from at least one of the residents of the first virtual local community, wherein a number of the residents approving the first agent is greater than a predetermined threshold;
authorizing the first agent as a first authorized agent and installing the first authorized agent in a homepage of each of the residents approving the first agent; and
assigning at least one share of ownership shares of the first authorized agent to each of the residents that have approved the first authorized agent, wherein each of the residents in the first virtual local community that approved the first authorized agent is a co-owner of the first authorized agent.

2. The method of claim 1,
wherein the common local community identifier comprises a country code and an area code, and wherein the area code identifies a particular geographical area of a country that is identified by the country code.

3. The method of claim 2, wherein each resident identifier is in a format compatible with a standard of E.164 of the International Telecommunication Union (ITU), including a country code and an area code, wherein a resident identifier is used by a resident as a username to log into its respective 3D homepage.

4. The method of claim 3, wherein each resident identifier of each resident is automatically, without user intervention, generated and assigned by the social networking platform to the resident based on the geographical area of the resident, when the resident registers with the social networking platform, wherein the resident does not have an option to choose its username.

5. The method of claim 1, further comprising:
receiving a user input from a first resident of the first virtual local community, the user input selecting a first of a plurality of items decorated in a first 3D homepage associated with the first resident of the first virtual local community;
in response to the user input, identifying the first authorized agent that is associated with the first virtual local community and linked with the selected item;
activating the first authorized agent to contact a first goods/service provider over the Internet to allow the first resident to acquire an additional first item from the first goods/service provider at a price that was agree upon when the first authorized agent was authorized by residents and installed at the first virtual local community, wherein the first authorized agent is operated by an entity that is different from the first goods/service provider.

6. The method of claim 5, further comprising:
withdrawing funding from a first account of a credit union associated with the first resident, wherein the credit union is associated with the first virtual local community and owned by residents of the first virtual local community, wherein the first account of the credit unit was set up and funded when the first resident registered with the first virtual local community; and
transmitting the funding to the first authorized agent for acquiring the additional first item from the first goods/service provider, wherein the first authorized agent in turn pays the first goods/service provider.

7. The method of claim 6, further comprising:
adjusting ownership shares of the first authorized agent based on the completion of the purchasing transactions via the first authorized agent by residents of the first virtual local community;
updating an activity index associated with the first resident based on the purchase transaction via the first authorized agent, wherein the activity index of the first resident represents a participation level of the authorized agent; and
paying dividend of ownership shares of the first authorized agent to the first resident based on the activity index of the first resident, wherein the dividend paid is higher when the associated activity index is higher.

8. The method of claim 7, further comprising:
receiving a request from the first resident for subscribing advertisement news provided by an authorized advertisement agent;
providing a user interface to the first resident to allow the first resident to specify news subscription settings;
storing the news subscription settings in a user database associated with the first resident; and
transmitting advertisement management software to a client machine associated with the first resident, wherein the advertisement management software is installed as a plug-in to a browser running at the client machine of the first resident.

9. The method of claim 8, further comprising:
receiving an advertisement news from the authorized advertisement agent;
examining the news delivery settings of the first resident to determine whether the first resident has subscribed the received advertisement news; and
if the news delivery settings allow, transmitting the advertisement news to the advertisement management software running within the client machine of the first resident.

10. The method of claim 9, wherein the advertisement news is displayed as a banner within a browser running at the client machine of the first resident, wherein the banner includes a first field to allow the first resident to provide an opinion about the advertisement news, wherein the banner includes a second field to allow the first resident to propose a price that the first resident is willing to pay to purchase an item advertised in the advertisement news, and wherein the opinion and the proposed price are forwarded by the advertisement management software to the authorized advertisement agent.

11. A non-transitory computer-readable medium having instructions stored therein, which when executed by a computer, cause the computer to perform a method, the method comprising:
partitioning a plurality of users registered with a social networking platform over the Internet into a plurality of groups of residents based on actual geographical areas in which the users currently reside, each group of residents is associated with a particular geographical area representing a virtual local community, wherein each of the residents in each virtual local community is identified by a resident identifier (ID) which includes a common local community identifier that uniquely identifies the respective geographical area associated with the respective virtual local community;
creating a three-dimensional (3D) homepage for each of the residents in each of the virtual local communities, the 3D homepage representing an actual resident home associated with each resident who actually resides in the associated geographical area, the 3D homepage including a plurality of items decorated with the 3D homepage, wherein the items represent 3D models created using a technology for creating 3D images based on photos of real objects, goods or services owned or incurred by the resident in its respective actual resident home that were purchased or acquired from a plurality of goods and service (goods/service) providers;
associating an authorized agent with at least some of the items decorated in each of the 3D homepages of each virtual local community, an authorized agent being installed and associated with a particular virtual local community at the social networking platform only if a majority of the residents of that particular virtual local community authorizes the authorized agent, wherein each authorized agent is associated with a particular virtual local community and the authorized agent is identified by an authorized agent identifier having a common local community identifier that is associated with that virtual local community, and wherein an authorized agent is linked with a particular goods/service provider over the Internet that provides goods/service to an decorated item in a 3D homepage, wherein the authorized agent is to collectively on behalf of residents of the associated virtual local community to contact the associated goods/service provider for purchasing goods/services associated with the decorated item in the 3D homepage;
storing in one or more databases information concerning decorated items in each 3D homepage of each resident in each virtual local community, wherein the information is anonymous information without exposing identities of the residents;
providing a search interface to allow a user to search in the one or more databases to determine purchasing patterns or habits of residents of a particular virtual local community;
receiving a request from a third-party entity to deploy a first agent in a first virtual local community;
obtaining detailed information from the third-party entity concerning the first agent;
transmitting the detailed information to each resident of the first virtual local community for approval;
receiving an approval from at least one of the residents of the first virtual local community, wherein a number of the residents approving the first agent is greater than a predetermined threshold;
authorizing the first agent as a first authorized agent and installing the first authorized agent in a homepage of each of the residents approving the first agent; and
assigning at least one share of ownership shares of the first authorized agent to each of the residents that have approved the first authorized agent, wherein each of the residents in the first virtual local community that approved the first authorized agent is a co-owner of the first authorized agent.

12. The non-transitory computer-readable medium of claim 11, wherein the common local community identifier comprises a country code and an area code, and wherein the area code identifies a particular geographical area of a country that is identified by the country code.

13. The non-transitory computer-readable medium of claim 12, wherein each resident identifier is in a format compatible with a standard of E.164 of the International Telecommunication Union (ITU), including a country code and an area code, wherein a resident identifier is used by a resident as a username to log into its respective 3D homepage.

14. The non-transitory computer-readable medium of claim 13, wherein each resident identifier of each resident is automatically, without user intervention, generated and assigned by the social networking platform to the resident based on the geographical area of the resident, when the resident registers with the social networking platform, wherein the resident does not have an option to choose its username.

15. The non-transitory computer-readable medium of claim 11, wherein the method further comprises:
receiving a user input from a first resident of a first virtual local community, the user input selecting a first of a plurality of items decorated in a first 3D homepage associated with the first resident of the first virtual local community;
in response to the user input, identifying a first authorized agent that is associated with the first virtual local community and linked with the selected item;
activating the first authorized agent to contact a first goods/service provider over the Internet to allow the first resident to acquire an additional first item from the first goods/service provider at a price that was agree upon when the first authorized agent was authorized by residents and installed at the first virtual local community, wherein the first authorized agent is operated by an entity that is different from the first goods/service provider.

16. The non-transitory computer-readable medium of claim 15, wherein the method further comprises:
withdrawing funding from a first account of a credit union associated with the first resident, wherein the credit union is associated with the first virtual local community and owned by residents of the first virtual local community, wherein the first account of the credit unit was set up and funded when the first resident registered with the first virtual local community; and
transmitting the funding to the first authorized agent for acquiring the additional first item from the first goods/service provider, wherein the first authorized agent in turn pays the first goods/service provider.

17. The non-transitory computer-readable medium of claim 16, wherein the method further comprises:
adjusting ownership shares of the first authorized agent based on the completion of the purchasing transactions via the first authorized agent by residents of the first virtual local community;
updating an activity index associated with the first resident based on the purchase transaction via the first authorized agent, wherein the activity index of the first resident represents a participation level of the authorized agent; and
paying dividend of ownership shares of the first authorized agent to the first resident based on the activity index of the first resident, wherein the dividend paid is higher when the associated activity index is higher.

18. The non-transitory computer-readable medium of claim 17, wherein the method further comprises:
receiving a request from the first resident for subscribing advertisement news provided by an authorized advertisement agent;
providing a user interface to the first resident to allow the first resident to specify news subscription settings;
storing the news subscription settings in a user database associated with the first resident; and
transmitting advertisement management software to a client machine associated with the first resident, wherein the advertisement management software is installed as a plug-in to a browser running at the client machine of the first resident.

19. The non-transitory computer-readable medium of claim 18, wherein the method further comprises:
receiving an advertisement news from the authorized advertisement agent;
examining the news delivery settings of the first resident to determine whether the first resident has subscribed the received advertisement news; and
if the news delivery settings allow, transmitting the advertisement news to the advertisement management software running within the client machine of the first resident.

20. The non-transitory computer-readable medium of claim 19, wherein the advertisement news is displayed as a banner within a browser running at the client machine of the first resident, wherein the banner includes a first field to allow the first resident to provide an opinion about the advertisement news, wherein the banner includes a second field to allow the first resident to propose a price that the first resident is willing to pay to purchase an item advertised in the advertisement news, and wherein the opinion and the proposed price are forwarded by the advertisement management software to the authorized advertisement agent.

21. A data processing system, comprising:
a processor; and
a memory coupled to the processor to store instructions, which when executed by the processor, cause the processor to perform a method, the method comprising:
partitioning a plurality of users registered with a social networking platform over the Internet into a plurality of groups of residents based on actual geographical areas in which the users currently reside, each group of residents is associated with a particular geographical area representing a virtual local community, wherein each of the residents in each virtual local community is identified by a resident identifier (ID) which includes a common local community identifier that uniquely identifies the respective geographical area associated with the respective virtual local community;
creating a three-dimensional (3D) homepage for each of the residents in each of the virtual local communities, the 3D homepage representing an actual resident home associated with each resident who actually resides in the associated geographical area, the 3D homepage including a plurality of items decorated with the 3D homepage, wherein the items represent 3D models created using a technology for creating 3D images based on photos of real objects, goods or services owned or incurred by the resident in its respective actual resident home that were purchased or acquired from a plurality of goods and service (goods/service) providers;

associating an authorized agent with at least some of the items decorated in each of the 3D homepages of each virtual local community, an authorized agent being installed and associated with a particular virtual local community at the social networking platform only if a majority of the residents of that particular virtual local community authorizes the authorized agent, wherein each authorized agent is associated with a particular virtual local community and the authorized agent is identified by an authorized agent identifier having a common local community identifier that is associated with that virtual local community, and wherein an authorized agent is linked with a particular goods/service provider over the Internet that provides goods/service to an decorated item in a 3D homepage, wherein the authorized agent is to collectively on behalf of residents of the associated virtual local community to contact the associated goods/service provider for purchasing goods/services associated with the decorated item in the 3D homepage;

storing in one or more databases information concerning decorated items in each 3D homepage of each resident in each virtual local community, wherein the information is anonymous information without exposing identities of the residents;

providing a search interface to allow a user to search in the one or more databases to determine purchasing patterns or habits of residents of a particular virtual local community;

receiving a request from a third-party entity to deploy a first agent in a first virtual local community;

obtaining detailed information from the third-party entity concerning the first agent;

transmitting the detailed information to each resident of the first virtual local community for approval;

receiving an approval from at least one of the residents of the first virtual local community, wherein a number of the residents approving the first agent is greater than a predetermined threshold;

authorizing the first agent as a first authorized agent and installing the first authorized agent in a homepage of each of the residents approving the first agent; and assigning at least one share of ownership shares of the first authorized agent to each of the residents that have approved the first authorized agent, wherein each of the residents in the first virtual local community that approved the first authorized agent is a co-owner of the first authorized agent.

22. The system of claim 21,
wherein the common local community identifier comprises a country code and an area code, and wherein the area code identifies a particular geographical area of a country that is identified by the country code.

23. The system of claim 22, wherein each resident identifier is in a format compatible with a standard of E.164 of the International Telecommunication Union (ITU), including a country code and an area code, wherein a resident identifier is used by a resident as a username to log into its respective 3D homepage.

24. The system of claim 23, wherein each resident identifier of each resident is automatically, without user intervention, generated and assigned by the social networking platform to the resident based on the geographical area of the resident, when the resident registers with the social networking platform, wherein the resident does not have an option to choose its username.

25. The system of claim 21, wherein the method further comprises:
receiving a user input from a first resident of the first virtual local community, the user input selecting a first of a plurality of items decorated in a first 3D homepage associated with the first resident of the first virtual local community;

in response to the user input, identifying the first authorized agent that is associated with the first virtual local community and linked with the selected item;

activating the first authorized agent to contact a first goods/service provider over the Internet to allow the first resident to acquire an additional first item from the first goods/service provider at a price that was agree upon when the first authorized agent was authorized by residents and installed at the first virtual local community, wherein the first authorized agent is operated by an entity that is different from the first goods/service provider.

26. The system of claim 25, wherein the method further comprises:
withdrawing funding from a first account of a credit union associated with the first resident, wherein the credit union is associated with the first virtual local community and owned by residents of the first virtual local community, wherein the first account of the credit unit was set up and funded when the first resident registered with the first virtual local community; and transmitting the funding to the first authorized agent for acquiring the additional first item from the first goods/service provider, wherein the first authorized agent in turn pays the first goods/service provider.

27. The system of claim 26, wherein the method further comprises:
adjusting ownership shares of the first authorized agent based on the completion of the purchasing transactions via the first authorized agent by residents of the first virtual local community;

updating an activity index associated with the first resident based on the purchase transaction via the first authorized agent, wherein the activity index of the first resident represents a participation level of the authorized agent; and paying dividend of ownership shares of the first authorized agent to the first resident based on the activity index of the first resident, wherein the dividend paid is higher when the associated activity index is higher.

28. The system of claim 27, wherein the method further comprises:
receiving a request from the first resident for subscribing advertisement news provided by an authorized advertisement agent;

providing a user interface to the first resident to allow the first resident to specify news subscription settings;

storing the news subscription settings in a user database associated with the first resident; and transmitting advertisement management software to a client machine associated with the first resident, wherein the advertisement management software is installed as a plug-in to a browser running at the client machine of the first resident.

29. The system of claim 28, wherein the method further comprises:

receiving an advertisement news from the authorized advertisement agent;

examining the news delivery settings of the first resident to determine whether the first resident has subscribed the received advertisement news; and if the news delivery settings allow, transmitting the advertisement news to the advertisement management software running within the client machine of the first resident.

30. The system of claim 29, wherein the advertisement news is displayed as a banner within a browser running at the client machine of the first resident, wherein the banner includes a first field to allow the first resident to provide an opinion about the advertisement news, wherein the banner includes a second field to allow the first resident to propose a price that the first resident is willing to pay to purchase an item advertised in the advertisement news, and wherein the opinion and the proposed price are forwarded by the advertisement management software to the authorized advertisement agent.

* * * * *